United States Patent [19]

Fitzpatrick et al.

[11] Patent Number: 4,581,568

[45] Date of Patent: Apr. 8, 1986

[54] METHOD AND APPARATUS FOR AUTOMATICALLY SETTING THE DEMAND PHASE LAG INPUT TO AN INDUCTION-MOTOR POWER FACTOR CONTROLLER

[75] Inventors: Michael Fitzpatrick, Yealmpton; David C. Groom, Totnes; Raymond E. Bristow, South Brent, all of England

[73] Assignee: Fairford Electronics Ltd., Devon, England

[21] Appl. No.: 631,560

[22] PCT Filed: Dec. 7, 1983

[86] PCT No.: PCT/GB83/00323

§ 371 Date: Jul. 17, 1984

§ 102(e) Date: Jul. 17, 1984

[87] PCT Pub. No.: WO84/02404

PCT Pub. Date: Jun. 21, 1984

[30] Foreign Application Priority Data

Dec. 11, 1982 [GB] United Kingdom ............ 8235370
Dec. 22, 1982 [GB] United Kingdom ............ 8236465

[51] Int. Cl.$^4$ ............................................. H02P 5/40
[52] U.S. Cl. ................................. 318/729; 318/812; 318/778
[58] Field of Search ................. 318/729, 812, 778

[56] References Cited

U.S. PATENT DOCUMENTS

| | | | |
|---|---|---|---|
| 3,554,640 | 1/1971 | Hoskins | 355/8 |
| 3,586,450 | 6/1971 | Hosey et al. | 355/8 |
| 3,604,796 | 9/1971 | Ogawa | 355/8 X |
| 3,619,750 | 11/1971 | Mokrytzkl | |
| 4,361,792 | 11/1982 | Davis, Jr. et al. | 318/729 |
| 4,408,149 | 10/1983 | Collings | 318/729 |
| 4,454,462 | 6/1984 | Spann | 318/729 |

FOREIGN PATENT DOCUMENTS 3218421 11/1983 Fed. Rep. of Germany .
2084360 7/1982 United Kingdom .

Primary Examiner—David Smith, Jr.
Attorney, Agent, or Firm—Cushman Darby & Cushman

[57] ABSTRACT

Motor power-factor controllers (12) act, in the presence of varying motor loads, to maintain the phase lag angle ($\phi_M$) between motor voltage and current at a preset demand or reference phase-lag value ($\phi_R$) by regulating the firing angle of gate-controlled switching devices (11) connected in series with the motor supply (A, B, C). The optimum reference phase-lag value ($\phi_R$) depends on the motor characteristics and will be as small as possible while providing for a stable, unambiguous control characteristic. A reference-setting unit (14) is provided for automatically setting an appropriate reference phase lag ($\phi_R$). This unit (14) monitors the motor phase lag ($\phi_M$) during start up and sets the reference phase lag ($\phi_R$) to a value corresponding to the minimum monitored phase lag plus a predetermined amount (for example 8°). The unit (14) can be arranged to seek to improve on the set reference ($\phi_R$) during motor running by repeatedly comparing the actual phase lag ($\phi_M$) plus said predetermined amount, with the set reference ($\phi_R$) and resetting the latter to the former if this has a lesser value.

7 Claims, 7 Drawing Figures

METHOD AND APPARATUS FOR AUTOMATICALLY SETTING THE DEMAND PHASE LAG INPUT TO AN INDUCTION-MOTOR POWER FACTOR CONTROLLER

FIELD OF THE INVENTION

The present invention relates to a method and apparatus for automatically setting the demand phase lag input to a power factor controller controlling an a.c. induction motor.

BACKGROUND OF THE INVENTION

Induction motor controllers are known which in the presence of varying motor loads act to maintain the phase lag angle $\phi$ between motor voltage and current at a preset demand or reference value by regulating the voltage applied to the motor (the higher the load the higher the applied voltage required). In case of a three-phase motor with its three main windings connected in a star of delta configuration, regulation is effected either in each supply phase or each motor winding (the latter differing from the former for delta-connected motors). Voltage regulation is generally carried out by gate-controlled switching devices which results in the voltage and current waveforms being discontinuous; under these circumstances the phase lag angle $\phi$ between current and voltage is generally taken to be the angle of lag between the returns to zero of the current and voltage. Since the phase lag angle $\phi$ is a measure of the power factor of the motor, controllers acting to maintain a particular phase lag angle $\phi$ are often termed "power factor controllers". Examples of such controllers are to be found in G.B. Patent Specification No. 1,551,644 (NASA), G.B. No. 2,084,360A (National Research Development Corporation), and G.B. No. 2,084,355 corresponding to U.S. Pat. No. 4,361,792 assigned to Chesebrough-Pond).

As used herein, the term "power factor controller" is to be taken as referring generally to controllers of the type which seek to achieve a given phase lag angle by controlling the voltage applied to a single or polyphase induction motor. Furthermore, the terms "phase lag angle" and "phase lag" are to be understood as meaning the angle by which the current lags behind voltage in each motor winding or phase of the motor supply, this angle being measured, in the case of discontinuous current and voltage waveforms, in terms of the period over which current flows, before reversal, after the immediately preceding voltage zero crossing.

With known power factor controllers, the actual lag angle $\phi$ is measured either by directly or indirectly timing the delay between voltage and current zeros in the same motor winding or supply phase. This measured lag angle is then compared with the reference lag angle value to produce an error signal on the basis of which the applied voltage is varied (an increase in the applied voltage being effected if the measured lag angle is less than the reference value and vice versa). Voltage regulation is, as already mentioned, generally effected by the controlled firing of gate-controlled switching devices, such as triacs and thyristors, connected into the motor windings or supply lines.

The preset reference value of the phase lag angle $\phi$ should be chosen to satisfy two conditions, namely to give a high power factor (and therefore high motor efficiency) and to ensure that the motor operates on a part of its characteristic which enables the controller to ascertain unambiguously the sign of any load variation from changes in the measured phase lag about the reference value. This latter condition is normally satisfied by arranging for the motor to operate on that part of its characteristic in which, for a given applied voltage, increases in load decrease the actual phase lag and vice versa.

In many known power factor controllers, the phase lag reference value is manually set by adjustment of, for example, a potentiometer arranged to provide a voltage signal indicative of the desired reference phase lag (see, for instance, FIG. 1 of the afore-mentioned GB specification No. 2084360A where a potentiometer 24 is used to set a reference voltage, termed $V_{REF}$, which is representative of the desired phase lag angle). Since the optimum value for the phase lag reference is dependent on the characteristics of the motor to be controlled, the process of setting in the reference value generally involves progressive adjustment during trial running of the motor. This setting in procedure is both time consuming and costly.

Clearly, it would be advantageous if a suitable value of the demand or reference phase lag input to a power factor controller could be automatically set upon controller being connected up to a motor.

One such self-calibrating controller is described in the aforesaid G.B. Specification No. 2,084,355A. With this controller, after the motor to be controlled has run up to speed, the controller first operates in a calibrating mode. In this mode, the controller progressively adjusts the firing of the gate-controlled switching device used to control motor energization, until the delay angle between the motor current falling to zero and the next firing of the switching device is equal to the measured phase lag angle. This angle value is then used as the required reference phase lag for operation of the controller in its normal, run mode. The value of the reference phase lag produced by this method is far from ideal and GB No. 2,084,355A gives an empirical formula for deriving a better reference value. This formula contains various constants, the values of which have been determined by experimentation. The described self-calibration method is, in fact, highly empirical in nature and does not necessarily provide the optimum reference phase lag for any particular motor connected to the controller.

SUMMARY OF THE INVENTION

It is an object of the present invention to provide improved methods and apparatus for automatically setting the value of the demand or reference phase lag input to a power factor controller. The method and apparatus of the present invention are based on the fact that during start-up of an induction motor (initial starting and run up to speed) the lag angle will initially start high and then decrease to a minimum before increasing to its normal operating value. By monitoring the phase lag variation during motor start-up it is thus possible to determine a suitable reference phase lag value which generally satisfies the conditions outlined above.

According to one aspect of the present invention, there is provided a method of automatically setting the value of a reference signal determining the phase lag angle to be aimed for by a power-factor controller controlling a single or polyphase induction motor, said method involving the steps of:

(a) deriving a phase-lag signal indicative of the phase lag between current and voltage in at least one of the motor windings or phases of the motor supply during motor start-up.

(b) utilizing the phase-lag signal to derive a signal representing a phase lag value that exceeds by a predetermined amount the minimum phase lag which, according to the phase-lag signal, is achieved during motor start-up, and (c) setting the value of said reference signal to that of the signal provided in step (b).

According to another aspect of the invention, there is provided, in a power-factor controller for controlling a single or polyphase a.c induction motor, an arrangement for automatically setting the value of a reference signal determining the phase lag value to be aimed for by the controller, said arrangement comprising:

signal-generating means for generating a phase-lag signal indicative of the phase lag of the current relative to applied voltage in the, at least one of the, motor windings or phases of the motor supply, signal processing means arranged to utilize the phase lag signal to derive a signal representing a phase lag value that exceeds by a predetermined amount the minimum phase lag which, according to the phase-lag signal, is achieved during motor start-up, and a reference-signal memory operative to store said signal provided by the signal processing means and to output this signal as said reference signal.

In this manner, an appropriate phase lag reference is automatically set during motor start-up without the need for any prior adjustments to be made or for any prior knowledge of the characteristics of the motor. The said predetermined amount by which the reference phase lag exceeds the minimum measured phase lag may be a fixed value (for example, 8°) or a predetermined factor of the minimum phase lag (for example 10%).

Under certain motor start-up conditions, such as a running start or starting effected with a very lightly loaded motor, it may in practice prove difficult to ascertain the minimum phase lag angle due to the very rapid run up to speed of the motor. In order to avoid a wholly inappropriate reference phase lag value being set under such conditions, the reference signal value is set to a non-optimized but workable, value (for example, 54°) unless a better value (that is, a greater value) is achieved during start-up. Advantageously, the phase lag angle is then monitored during running of the motor with a view to determining a new reference value more appropriate than the predetermined one initially set. This process relies upon the fact that as the motor load varies, the phase lag will momentarily depart from its target value and may attain a value which is less than the set reference value minus the said predetermined amount; if this is the case then, a new reference value is set equal to the attained phase lag value plus the said predetermined amount. In this manner, the reference phase lag can be progressively optimized during motor operation.

Of course, this optimization process can with advantage be used regardless of whether the reference value has been apparently acceptably determined during start-up since this latter value may, for some reason, not in fact be optimum.

Thus, in a broader aspect, the present invention provides a method of automatically setting the value of a reference signal determining the phase lag angle to be aimed for by a power factor controller controlling a single or polyphase induction motor, said method involving the steps of:

(a) deriving a phase-lag signal indicative of the phase lag between current and voltage in the, or at least one of the, motor windings or phases of the motor supply during operation of the motor, (b) determining repeatedly or continuously whether the combination of the phase lag represented by the phase-lag signal and a predetermined amount, is less than the phase lag represented by the existing value of said reference signal, and (c) changing the value of the reference signal to that corresponding to the phase lag value of said combination where the latter is determined in step (b) to be less than the phase lag represented by the previously existing reference signal value.

This optimisation method can, of course, be effected both during motor start-up and during motor running.

BRIEF DESCRIPTION OF THE DRAWINGS

Various other novel aspects and features of the invention will become apparent from the following description, given by way of example, of a power factor controller incorporating an arrangement for automatically setting the demand phase lag input of the controller, reference being made to the accompanying diagrammatic drawings, in which.

DETAILED DESCRIPTION OF THE DRAWINGS

Figure 1:
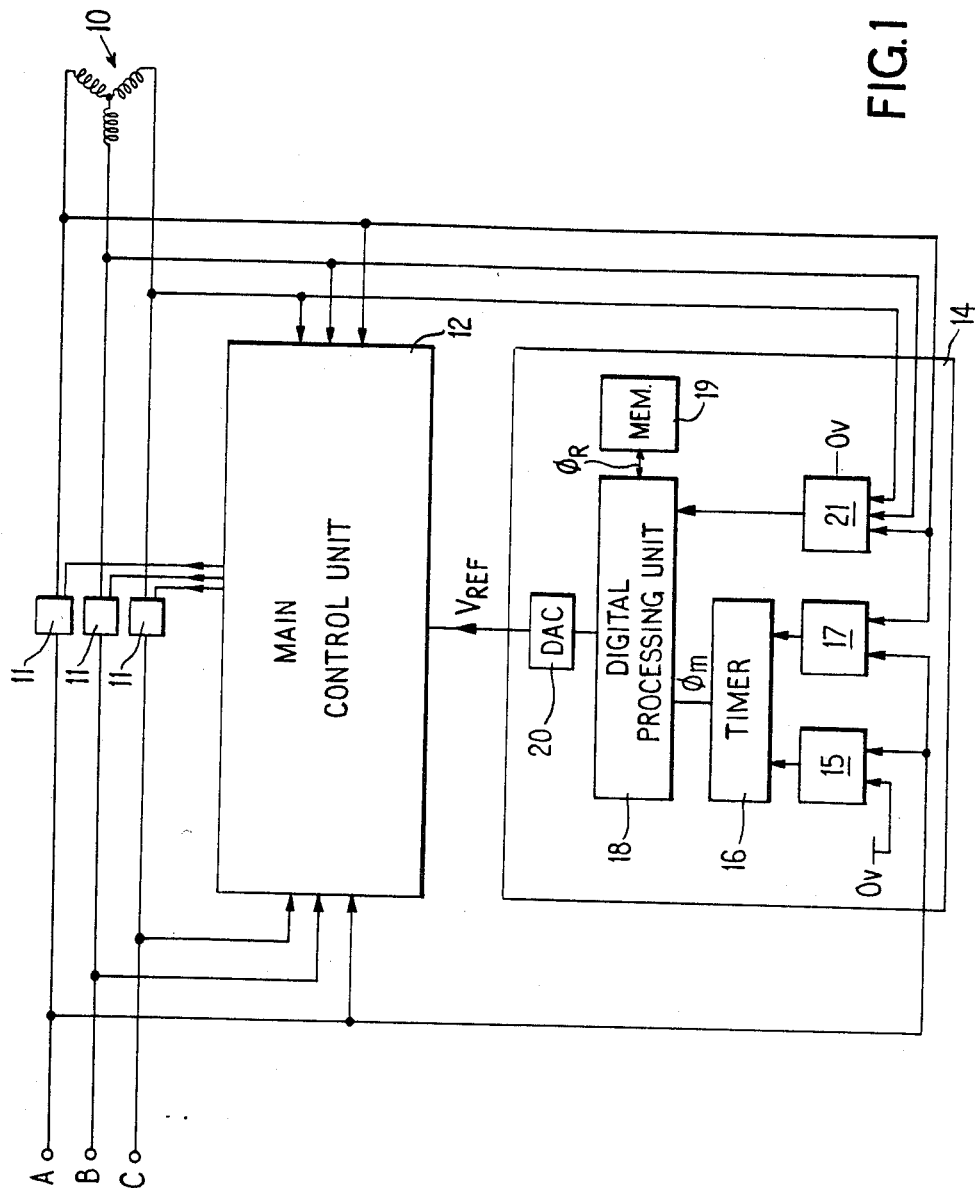
FIG. 1 is a block diagram of the power factor controller connected to control a three-phase induction motor.

Shown in FIG. 1 is a power factor controller arranged to control a three-phase induction motor 10 by the controlled firing of three switching devices 11 connected into respective lines of a three-phase supply (phases A, B and C). The controller operates to so regulate the voltage applied to the motor 10 that the phase lag angle $\phi$ between the current and voltage in each supply phase is maintained at or near a preset demand or reference value. This control process is effected by a main control unit 12 fed with the phase voltages, the motor terminal voltages and a reference signal $V_{REF}$ the voltage value of which represents the demand or reference phase lag value. The unit 12 is arranged to use the phase voltages and motor terminal voltages to measure the actual phase lag in each of the three supply phases, to produce an average phase lag signal, to compare this average signal with the reference signal $V_{REF}$, and to appropriately adjust the timing of the firing of the devices 11 relative to the voltage zeroes of the corresponding phases. Power factor controllers operating in this manner are known, one example being the controller described in G.B. Specification No. 2084359A; a detailed description of the circuitry of the main control unit 12 will therefore not be given herein.

Before proceeding to describe how the present controller automatically sets the value of the reference signal $V_{REF}$, consideration will first be given to the operating characteristics of the induction motor 10 and how the main control unit 12 utilizes these characteristics to carry out its control process.

Figure 2:
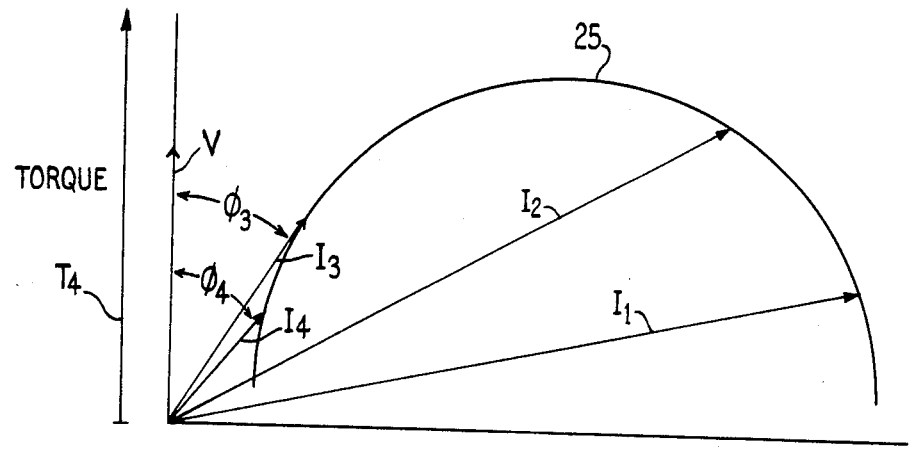
FIG. 2 is a simplified circle diagram showing the relationship between the current and voltage phasors during operation of the induction motor.

The circle diagram shown in FIG. 2 illustrates, in simplified manner, the inter-relationship between the voltage and current phasors of one supply phase for a given magnitude of voltage applied to the motor. If the voltage phasor V is taken as coincident with the abscissa in FIG. 2, then the current phasor I will terminate at a point on the semi-circular characteristic curve 25 determined by the speed and loading of the motor. The angle between the current and voltage phasors V and I corresponds to the phase lag angle $\phi$ between the current and voltage in the motor supply line concerned. Upon initial energisation of the motor, a large current $I_1$ will flow. As the speed of the motor builds up, the motor passes in an anticlockwise direction around its characteristic curve 25 with the current passing through values $I_2$ and $I_3$ until the motor reaches its normal operating point on the curve 25 (corresponding to a current $I_4$ in FIG. 2). The position of this operating point will, of course, depend on the loading of the motor; in fact, a torque scale can be provided by the abscissa to enable the motor operating point on the curve 25 to be determined for any particular torque value. Thus, for a torque value $T_4$, the motor resides at its afore-mentioned operating point in which the current has the value equal to $I_4$.

It will be seen that there exists a point on the curve 25 where the phase lag angle is at a minimum; in FIG. 2 this minimum phase lag is the phase lag $\phi_3$ corresponding to the current $I_3$. The motor operates at its maximum efficiency when the phase lag angle $\phi$ is at its minimum. However, for reasons which will become clearer hereinafter, the reference phase lag value $\phi_R$ set into the power factor controller is required to be some value, for example the value $\phi_4$, which is greater than the minimum value $\phi_3$ but still adequate to give a high power factor for the motor.

With a target phase lag value $\phi_R$ equal to $\phi_4$, the operating point of the motor on the characteristic 25 is in such a position that an increase in motor loading would, in the absence of any corrective action, result in the actual phase leg angle decreasing whereas a decrease in motor load would result in an increase in the phase lag angle. By measuring the actual phase lag present and comparing this angle with the reference value $\phi_R$ ($\phi_4$), the control unit 12 is arranged to respond to load changes by varying the voltage applied to the motor to bring the actual phase lag back to the reference value.

Figure 3:
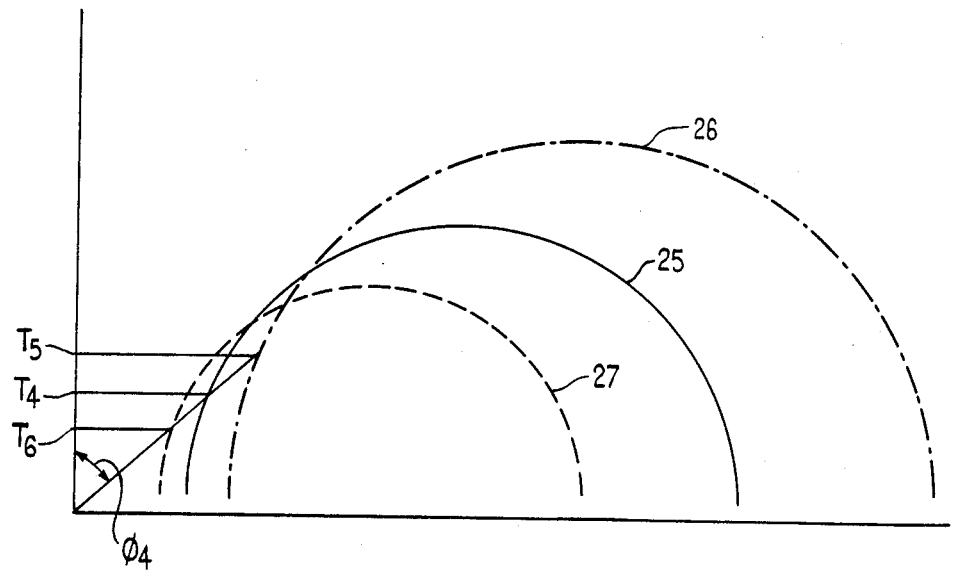
FIG. 3 is a diagram, similar to FIG. 2 illustrating the operation of the power factor controller.

The effect of changing the voltage applied to the motor on the phase lag angle is illustrated in FIG. 3 which, in addition to the motor characteristic 25, shows further characteristics 26 and 27 respectively corresponding to applied voltages greater than and less than that to which the curve 25 relates. With a motor loading equal to $T_4$, then as already seen, the reference phase angle is achieved with an applied motor voltage corresponding to that to which the curve 25 relates. From FIG. 3 it can be seen that if the motor loading increases from the value $T_4$ to a higher value $T_5$, then in order for the phase lag angle to be brought back to the reference value $\phi_R$ ($\phi_4$), the voltage applied to the motor must be increased to that corresponding to the characteristic curve 26; this increase in voltage is effected by decreasing the firing delay angle of the switching devices 11 relative to their corresponding phase voltage cycles. Conversely, if the motor loading is decreased from the value $T_4$ to a lesser value $T_6$, the voltage applied to the motor must be decreased to the value to which the curve 27 relates.

It will be noted that the whole control process relies upon the fact that the direction of phase lag variation depends on whether the motor loading is decreasing or increasing and therefore provides a reliable indication as to whether the voltage applied to the motor should be increased or decreased. If the reference phase lag angle $\phi_R$ were to be set equal to the minimum phase lag angle $\phi_3$, then both increases and decreases in motor loading would result in the phase lag angle increasing and it would then not be possible to tell whether the motor voltage should be increased or decreased. It is for this reason that the phase lag reference values is set to be greater than the minimum phase lag angle.

It is to be noted that, as can be seen in FIG. 3, the minimum phase lag angle is substantially independent of the voltage applied to the motor.

The phase lag reference signal $V_{REF}$ fed to the main control unit 12 is determined by a reference setting unit 14 which operates by continuously monitoring the phase lag between current and voltage in the supply phase A and which operates to set the reference phase lag to a value equal to the minimum measured value plus a predetermined amount. As will become clear hereinafter, the reference phase lag value is primarily determined during motor start up since during this operating period, the phase lag angle will generally pass through its minimum value as the motor runs up to its operating point.

The reference setting unit 14 is arranged to measure the phase lag angle in supply phase A by measuring the delay between a voltage zero in that phase and the following current zero (see FIGS. 4a and b which respectively show the phase A voltage waveform $V_A$ and the phase A current waveform). The voltage zero crossing point is determined by comparing the phase A voltage with a zero voltage input in a comparator 15, the comparator being arranged to generate an output pulse at the moment that the voltage $V_A$ becomes equal to zero. This output pulse is fed to a timer 16 to start a timing period.

Figure 4:
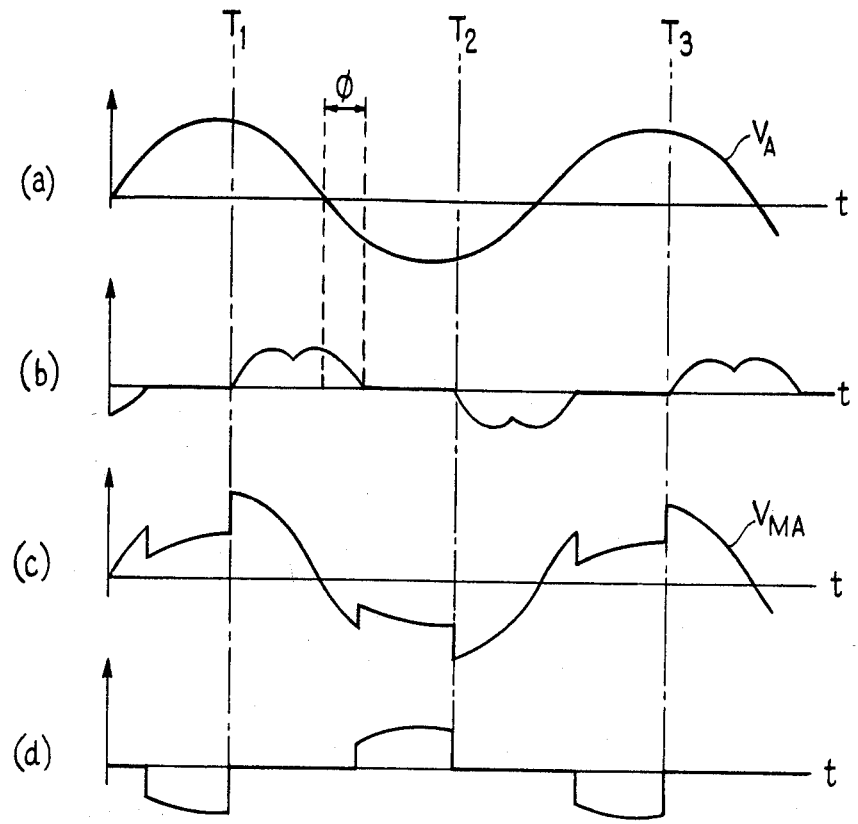
FIGS. 4(a) to (d) show various voltage and current waveforms present during controlled operation of the motor.

The current voltage zero points are determined by subtracting from the phase A voltage $V_A$ the voltage $V_{MA}$ present at the motor terminal connected to phase A (this voltage being shown in FIG. 4(c)); the resultant voltage, which is the voltage across the phase A switching device 11 (see FIG. 4(d)) has a zero value except during periods of non-conduction of the switching device 11. The end of these non-conduction periods are determined by the firing of the switching means (at times $T_1$, $T_2$, and $T_3$ in FIG. 4) while the start of these periods correspond to the moments when the current through the switching device 11 falls to zero. The current zeros in phase A can thus be identified by generating a pulse off the leading edge of the waveform pulses appearing across the switching device 11. The generation of such current-zero identifying pulses is effected by unit 17 of the reference-setting unit 14.

Each current-zero identifying pulse is used to terminate the period being timed by the timer 16. Since this period was initiated by a voltage zero in phase A, the timed period will be a measure of the phase lag angle in phase A. The timer 16 is, for example, constituted by a counter which when enabled by a pulse output from the comparator 15 serves to count the pulses coming from a reference oscillator, this counting being stopped by a current-identifying pulse from the unit 17.

The output from the timer 16 is fed to a processing circuit 18 which, in the present embodiment is a digital processing unit. This unit 18 holds in an associated memory 19 a digital signal representing the current reference phase lag value. The unit 18 as well as memorizing this reference-value digital signal also outputs the signal to a digital to analog converter 20 the output of which constitutes the reference signal $V_{REF}$ fed to the main control unit 12

Figure 5:
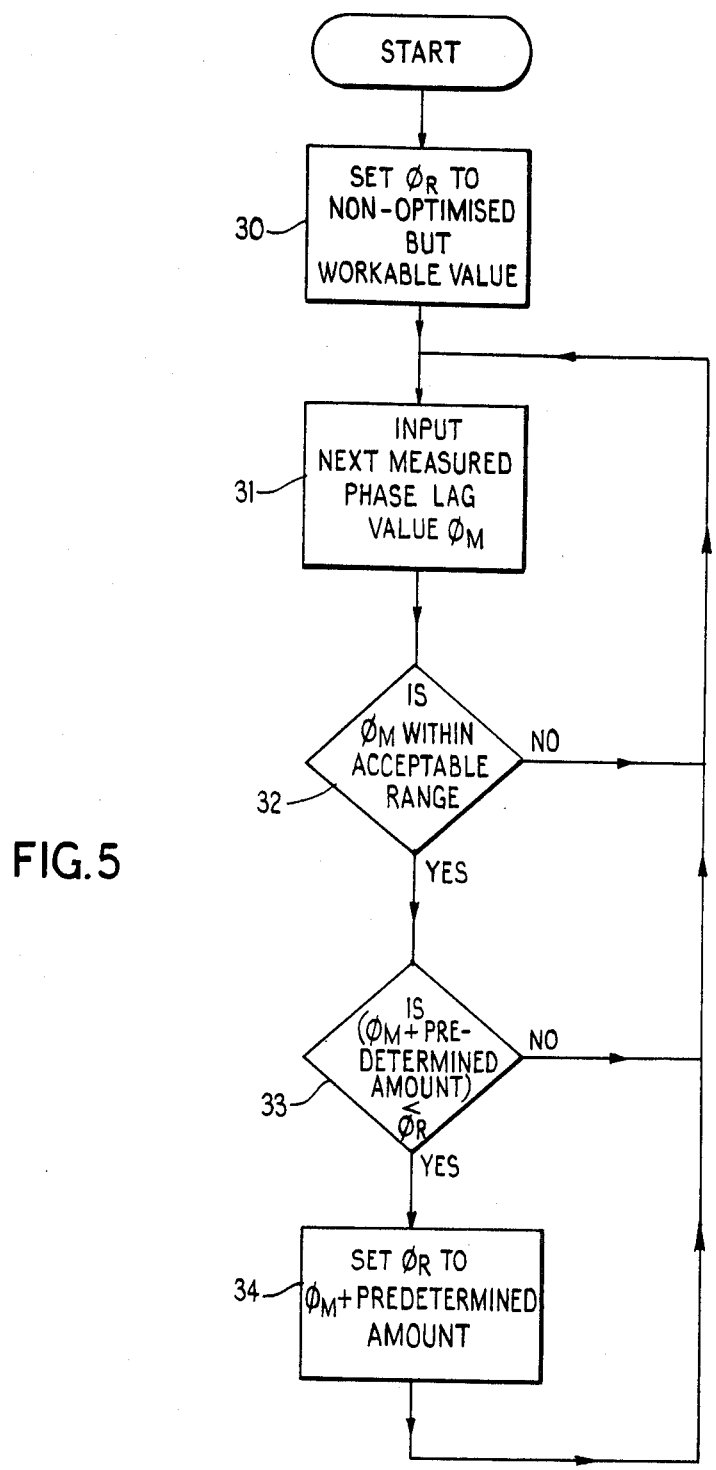
FIG. 5 is a flow chart showing the operation of a reference-setting unit of the controller.

The unit 18 is arranged to execute the algorithm set out in FIG. 5 in order to optimize the memorized reference phase lag value. On receipt of the signal from the timer 16 representing the measured phase lag angle $\phi_m$ in phase A, (see block 31 in FIG. 5) the unit 18 first checks that this angle lies within a predetermined range of acceptable values which if used to set the reference phase lag would give reasonable values for the reference phase lag (see block 32, the acceptable range being, for example, 18° to 46°). If the $\phi_m$ lies outside the acceptable range, the unit 18 waits for the next value of $\phi_m$ to be produced. However, if $\phi_m$ is acceptable, the unit 18 modifies the value of the phase lag signal so that it represents the measured phase lag $\phi_m$ plus a predetermined amount; the resultant modified signal is then compared with the reference value signal held in the memory 19 (see block 33). If the total phase lag represented by the modified signal is less than the phase lag represented by the reference-value signal, then the latter signal is adjusted in value to that of the former signal thereby setting a new reference phase lag (see block 34). The unit 18 then waits for the next value of $\phi_m$.

The predetermined amount by which the measured phase lag $\phi$ is increased before comparison with the reference phase lag, has a value set to ensure that any new reference phase lag adopted, while not far away in value from the known minimum phase lag is sufficiently distanced to enable unambiguous operation of the controller. The said predetermined amount may be a fixed value (preferably in the range 4° to 12° and typically 8°) or a fixed fraction of the measured phase lag (for example, 10%).

The optimizing adjustment of the reference phase lag by the reference setting unit 14 primarily occurs during the start-up of a motor by the controller. This start-up will generally by effected in a predetermined manner without phase lag control by means of a starting circuit (not shown). Various forms of motor starter are known and therefore the starting circuit will not be described in detail. During starting, the motor will pass around its characteristic curve to its operating point and the phase lag angle $\phi_m$ as measured by the timer 16 will first decrease to the minimum value $\phi_3$ before increasing to some higher value (see FIG. 2); this variation in measured phase lag angle remains true even if motor starting is effected by varying the voltage applied to the motor (for example, by varying the firing angle of the devices 11). As the measured phase lag angle passes through its various values, the processing unit 18 will progressively decrease the value of the stored reference phase lag until it sets the reference phase lag $\phi_R$ equal to the minimum value $\phi_3$ plus a predetermined amount, this combination being equal to the phase lag value $\phi_4$. Thereafter as the measured phase lag increases in value from $\phi_3$, the stored reference value $\phi_R$ remains unchanged at $\phi_4$.

At the end of the start up period, the main control unit 12 takes over control of the motor 10 and adjusts the firing of the devices 11 in dependence on the value of the reference signal $V_{REF}$.

If the motor should run up to speed very rapidly (for example, due to a very light loading or due to a running start), the reference setting unit 14, which only measures the phase lag angle at the supply frequency, may not be able to determine the most suitable reference phase lag value during the start-up period. In order to ensure that a wholly inappropriate reference value is not set, the processing unit 18 is arranged to initially set the reference phase lag value to a non-optimized but workable value, for example, 54° (see block 30 in FIG. 5).

During normal running of the motor under the control of the main control unit 12, the reference setting unit 14 continues to measure the phase lag angle $\phi_m$ in phase A and to update the stored reference value should a more appropriate value be found. It should be noted that although the control unit 12 seeks to maintain the phase lag angle constant at the set reference, any load variation will, at least initially, cause a variation in phase lag angle and it is from this variation that the reference setting unit 14 may be able to determine a better reference phase lag value, particularly in cases where the reference value at the end of the start up period still corresponds to the initially set predetermined value.

When the motor is abnormally loaded, the motor operating point may move round its maximum voltage characteristic curve in a clockwise direction past the point corresponding to minimum phase lag and into the region of the curve in which an increase in load produces an increase in phase lag angle. Since this phase lag variation is opposite to that which normally occurs, the main control unit 12 responds to this condition by decreasing the applied voltage and the motor will very quickly stall. This condition can be identified by a stall detection circuit 21 which, upon stall detection, operates to override the main control unit for a limited period to establish maximum conduction conditions and bring the motor out of stall.

Since one possible contributory factor to the motor entering stall conditions is too low a value for the reference phase lag, the stall detection circuit 21, upon detecting a stall condition, also initiates the setting of a new reference phase lag value. This new reference value is made equal to the sum of the phase lag measured at the time of stall detection and a predetermined amount (for example, 8°); this value is, of course, large and as the motor resumes normal operation, the reference setting unit 14 will progressively set smaller reference values.

Figure 7:
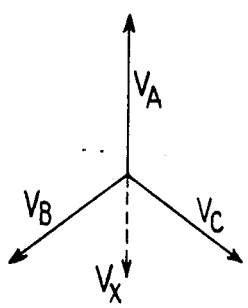
FIG. 7 is a phasor diagram showing the supply phase voltages.
Figure 6:
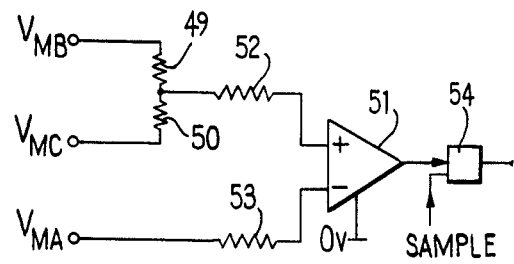
FIG. 6 is a circuit diagram of a stall detection circuit of the controller.

The stall detection circuit 21 is shown in detail in FIG. 6. This circuit includes two resistors 49, 50 connected in series across the motor terminals connected to the supply phases B and C (the voltages on these terminals being designated $V_{MB}$ and $V_{MC}$ respectively). The resistors 49, 50 are substantially equal in value and the voltage at their point of mutual interconnection can be shown to be equal to the voltage $V_X$ depicted in the voltage phasor diagram diagram of FIG. 7. This voltage $V_X$ is equal to $-V_A/2$. The voltage $V_X$ is fed via a resistor 52 to the non-inverting input of an amplifier, while the voltage $V_{MA}$ appearing at the motor terminal connected to the phase A supply line, is fed via a resistor 53 to the inverting input of the amplifier 51. The output of the amplifier 51 is sampled using a gate 54 during the non-conduction period of the switching device 11 in phase A, preferably just before the firing of this device (the sampling pulse is, for example, generated by the main control unit 12 by any suitable means).

Considering the operation of the stall detection circuit 21 during a period of non-conduction of the phase A device, when the motor is running normally the voltage $V_{MA}$ will generally be of the same sign as the phase A voltage $V_A$ so that the output of the amplifier will be a large positive or negative value. However, under stall conditions when no back e.m.f's are produced in the motor windings, the value of the voltage $V_{MA}$ will be equal to the voltage $V_X$ (this of course, is only true when the switching devices in phases B and C are conducting). Under these conditions, the output from the amplifier 51 will also be zero. To allow for unequal phase voltages and similar imbalances, the amplifier can be designed such that its output is zero for small differences between its input voltages.

From the foregoing it can be seen that the presence of a zero voltage at the output of the amplifier 51 during a period of non-conduction of the phase A switching device, is indicative of the motor having stalled. The value of the reference $V_X$ against which $V_{MA}$ is compared can be reduced in value by a grounded potentiometer at the non-inverting input to the amplifier 51 in order to advance stall detection.

The digital processing unit 18 of the reference-setting unit 14 can conveniently be implemented using a microprocessor programmed to execute the algorithm set out in FIG. 5; the writing of a suitable program is well within the capability of persons skilled in the programming art so that such a program will not be detailed herein.

Various modifications to the described reference-setting unit are, of course, possible. Thus, in order to avoid a noise-corrupted measured phase lag value from being used to set the reference phase lag, the processing unit 18 can be arranged to effect the steps of blocks 32 to 34 only when the last two or three measured phase lags all lie within close limits of one another.

Furthermore, although the described reference-setting unit 14 is generally digital in form, it will be appreciated that the unit 14 could be implemented using analog techniques. Thus various analog phase measurement circuits are known which can be used in place of the circuits 15 to 17, while the unit 18 could be constructed using analog comparators and any suitable memory for the reference value (in practice, a digital memory providing an analog output via a digital-to-analog converter would generally be used). With an analog form of unit 14, the comparison of the measured and reference phase lags is carried out on a continuous basis (rather than intermittently as with a digital system) though, of course, the measured phase lag will generally be of averaged form.

Various modifications, to the overall controller are also possible. Thus, for example, the main control unit 12 could take the form of a microprocessor-based unit in which case the digital to analog converter 20 of the illustrated reference setting unit 14 can be omitted. It will, of course, be appreciated that the form of the main control unit 12 is immaterial except in respect of the interface requirements it imposes on the reference setting unit 14.

Furthermore, in the case of a three-phase motor in which the three main windings of the motor are delta-connected, the described power factor controller could be arranged to measure the phase lag angle $\phi$ and effect voltage regulation in each motor winding arm rather than in each supply phase. In this case, measurement of phase lag in each winding is effected by measuring the time between a voltage zero in the line-to-line voltage applied across the winding arm and the subsequent return to zero of the winding current before reversal. The operation of the reference setting unit 14 is substantially the same as described above except that the phase lag monitored to derive the reference is that in a motor winding.

We claim:

1. A process for controlling a single or polyphase induction motor in which the value of a reference signal indicative of a reference phase log is automatically set, said method comprising the steps of:

deriving a phase lag signal indicative of the actual phase lag between current and voltage in at least one of the motor windings or phases of the motor supply;

comparing the actual phase lag as represented by the phase-lag signal with said reference phase lag represented by said reference signal;

increasing the average voltage applied to the motor upon the actual phase lag falling below said reference phase lag and decreasing the average applied motor voltage upon the actual phase lag exceeding said reference phase lag;

determining whether a combination of the actual phase lag represented by said phase-lag signal and a predetermined amount, is less than the phase lag represented by the existing value of said reference signal; and changing the value of said reference signal to that corresponding to the phase lag value of said combination when said combination is determined to be less than the phase lag represented by the existing value of said reference signal.

2. A method according to claim 1, wherein on motor start-up the reference signal is set to an initial value which is thereafter optimised in accordance with method steps (a) and (b) as the motor runs up to speed.

3. A method according to claim 1, wherein said predetermined amount corresponds to an angle within the range of 4° to 12°.

4. A method according to claim 1, wherein said predetermined amount is a predetermined fraction of the phase lag represented by the phase-lag signal.

5. A method according to claim 1, including the further step of detecting stall conditions of the motor and thereupon resetting the reference signal to a value representing the then current phase lag plus a preset amount.

6. A process for controlling a single or polyphase induction motor in which the value of a reference signal indicative of a reference phase lag is automatically set, said method comprising the steps of:

deriving a phase lag signal indicative of the actual phase lag between current and voltage in at least one of the motor windings or phases of the motor supply;

comparing the actual phase lag as represented by said phase lag signal with said reference phase lag as represented by said reference signal;

increasing the average voltage applied to the motor upon the actual phase lag falling below said reference phase lag and decreasing the average voltage applied to the motor upon the actual phase lag exceeding said reference phase lag;

monitoring said phase lag signal during motor start up and deriving therefrom a signal representing a phase lag value that exceeds by a predetermined amount the minimum phase lag which, according to the phase lag signal, is achieved during motor start-up; and setting the value of said reference signal to that of said derived signal.

7. A power factor controller for controlling a single or polyphase induction motor, the controller being arranged for automatically setting the value of a reference signal indicative of a reference phase lag, said controller comprising:

signal generating means for deriving a phase lag signal indicative of the actual phase lag between current and voltage in at least one of the, motor windings or phases of the motor supply;

a reference signal memory operative to store said reference signal value representative of said reference phase lag;

comparison means arranged to receive and compare said phase lag and reference signals;

voltage-adjusting means operative to adjust the average voltage applied to the motor in dependence on the result of the comparison effected by said comparison means, the voltage-adjusting means being arranged to increase the average applied motor voltage upon the actual phase lag as represented by said phase lag signal falling below said reference phase lag and being further arranged to decrease said average applied motor voltage upon the actual phase lag exceeding said reference phase lag; and signal processing means arranged to receive and monitor said phase lag signal during motor start up in order to derive therefrom a signal value representing a phase lag value that exceeds by a predetermined amount the minimum phase lag which, according to the phase lag signal, is achieved during motor start up, said signal processing means being further arranged to store said derived signal value in said reference signal memory as said reference signal value.

* * * * *